A. ZEHRUNG & R. RÜDENBERG.
ROTOR FOR DYNAMO ELECTRIC MACHINES.
APPLICATION FILED JAN. 9, 1915.
1,178,771.
Patented Apr. 11, 1916.
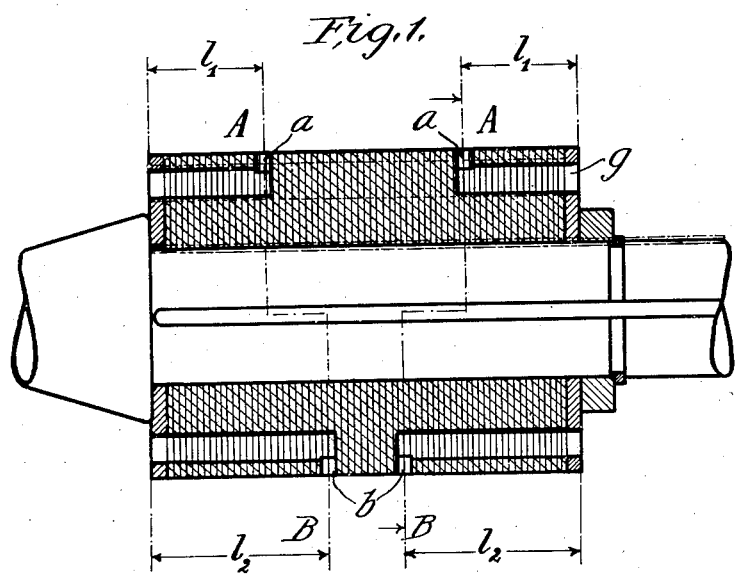
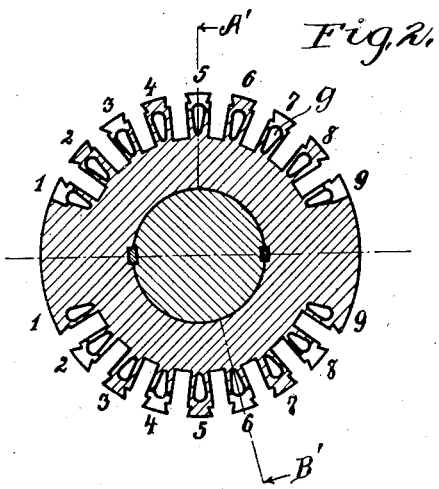

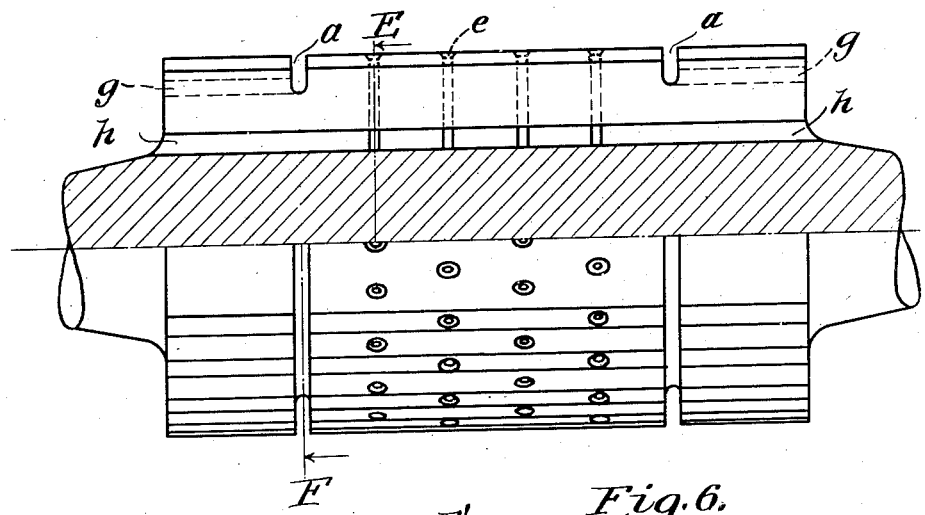
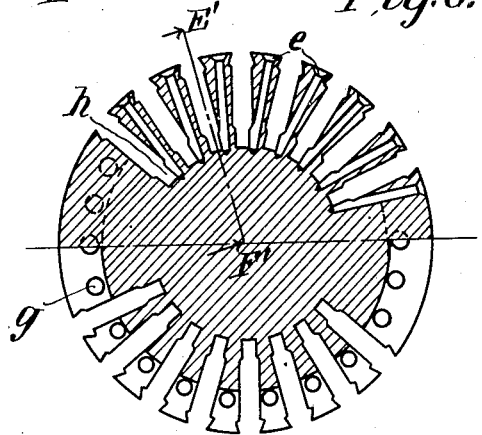

A. ZEHRUNG & R. RÜDENBERG.
ROTOR FOR DYNAMO ELECTRIC MACHINES.
APPLICATION FILED JAN. 9, 1915.

1,178,771.

Patented Apr. 11, 1916.
5 SHEETS—SHEET 4.

Witnesses:
Elsie Swenson
Ray J. Ernst

Inventors:
Albert Zehrung and
Reinhold Rüdenberg
By
Attorneys

UNITED STATES PATENT OFFICE.

ALBERT ZEHRUNG, OF BERLIN-WILMERSDORF, AND REINHOLD RÜDENBERG, OF BERLIN-CHARLOTTENBURG, GERMANY, ASSIGNORS TO SIEMENS-SCHUCKERT-WERKE, G. M. B. H., OF BERLIN, GERMANY, A CORPORATION OF GERMANY.

ROTOR FOR DYNAMO-ELECTRIC MACHINES.

1,178,771.   Specification of Letters Patent.   Patented Apr. 11, 1916.

Application filed January 9, 1915. Serial No. 1,430.

*To all whom it may concern:*

Be it known that we, ALBERT ZEHRUNG and REINHOLD RÜDENBERG, German citizens, and residents of Berlin-Wilmersdorf and Berlin-Charlottenburg, Germany, respectively, have invented certain new and useful Improvements in Rotors for Dynamo-Electric Machines, of which the following is a specification.

In rotors for dynamo electric machines, as known, axial channels are often provided for the supply of air and lateral openings in radial direction which communicate with said axial channels for permitting the discharging of the cooling air at different places of the axial channel. This arrangement possesses the disadvantage that the distribution of the cooling air will not be uniform on account of the fact that the greatest quantities of cooling air will naturally discharge at those openings which are first met during the passing of the air through the channel system. In case therefore the cooling air be conveyed from both sides of the rotor, the ends of the same would be most effectively cooled while toward the middle part of the rotor the discharge of the cooling air will be diminished and thus result into a cooling which is insufficient at the very places of greatest heat being developed. According to our invention this disadvantage is done away with by providing separate axial channels for the conveyance of air and individual radial discharge openings or groups of discharge openings arranged in the interior of the machine at a smaller or greater distance from the periphery.

Figure 3:
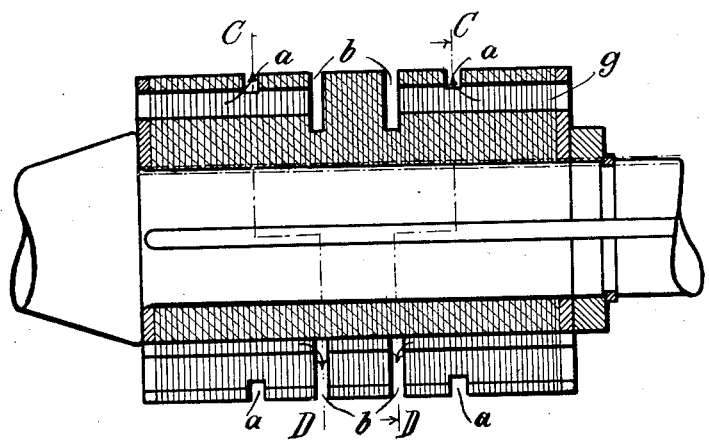
Figure 4:
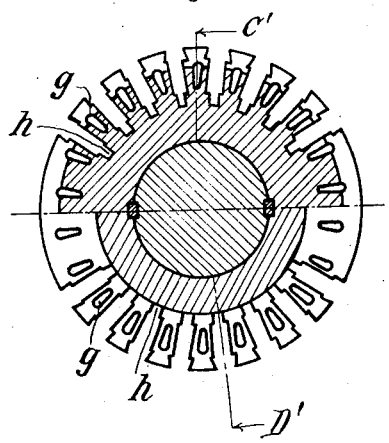
Figure 7:
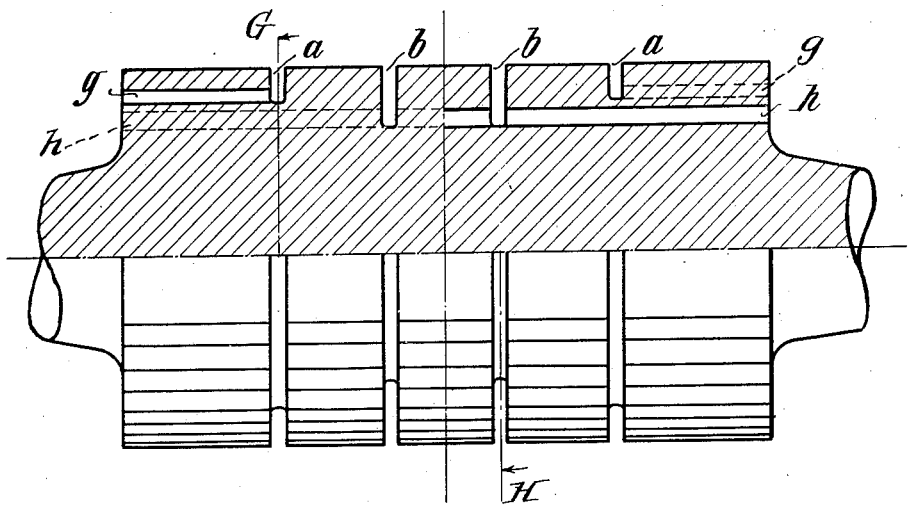
Figure 8:
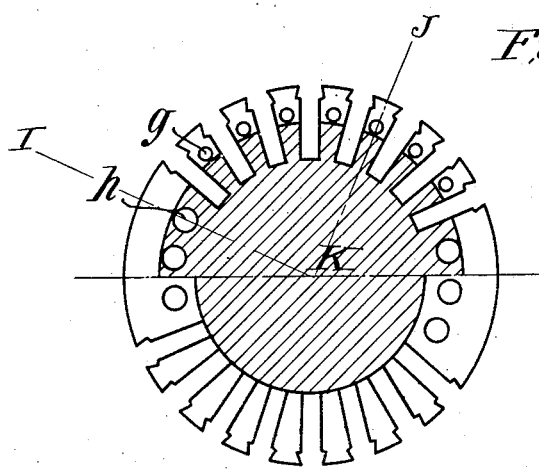
Figure 9:
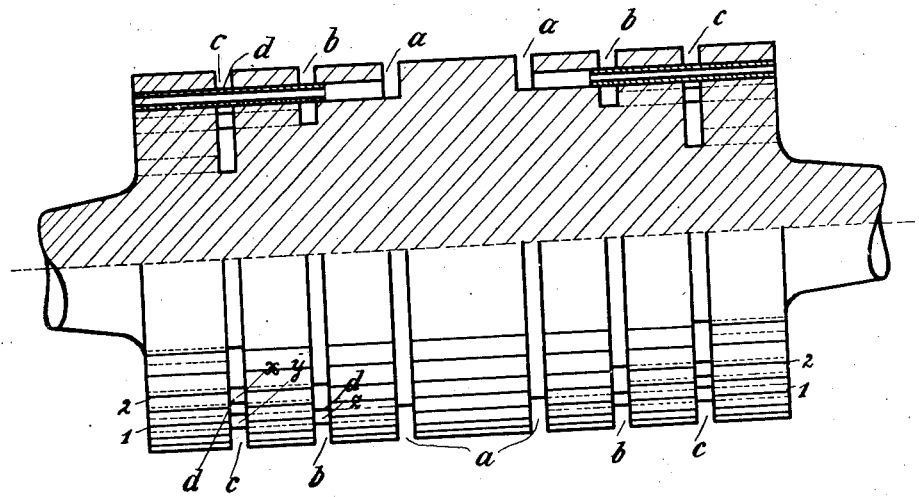

Figure 1 is a longitudinal section of a laminated rotor embodying the principles of our invention; said section corresponding to the line A'—B' of Fig. 2. Fig. 2 is a transverse section of the same on the line A—B of Fig. 1. Fig. 3 is a longitudinal section of another embodiment of our invention corresponding to line C'—D' of Fig. 4. Fig. 4 is a transverse section of the same on the line C—D, of Fig. 3. Fig. 5 is a combined side elevation and axial section of another embodiment, parts being broken away; the sectional portion of this figure corresponding to the line E'—F' of Fig. 6. Fig. 6 is a transverse section of the same on the line E—F of Fig. 5. Fig. 7 is a combined side elevation and axial section, the section of the right hand upper part being taken on the line I—K of Fig. 8 and the section of the left hand upper part being taken on the line J—K of Fig. 8, these figures showing another embodiment, parts being broken away; Fig. 8 is a transverse section of the same on the line G—H of Fig. 7. Fig. 9 is a combined side elevation and axial section of another embodiment, parts being broken away.

In Figs. 1 and 2, the teeth of the rotor, which is made of laminated construction, are provided with channels in axial direction. In distances $l_1$ and $l_2$ from either end of the rotor there are provided groups or sets of radial discharge openings for the cooling air, which openings are made by punching away the heads of the teeth as far as to the slot or channel positioned within the tooth. More particularly at the iron sheets which are positioned in the upper portion of section A—B those heads of the teeth are taken away by punching which are designated by uneven figures and those in the lower portion of said section which are designated by even figures. In this construction therefore one half of the axial channels will exhaust the air in the cross-sectional planes of the upper portions of sections A—B and the other half will exhaust in the cross-sectional planes of the lower portions of said sections. As in this case the cross-section of the axial channels for the introduction of the air is the same the desired distribution of air can most simply be regulated by closing the diameters of the radial ducts $a$, $b$, as *e. g.*, by making duct $a$ somewhat smaller than duct $b$ and thereby equalizing the same quantities of air by having the same resistance of flow in said axial channels of different lengths $l_1$ and $l_2$.

In Figs. 3 and 4 we have shown two groups or series of axial channels located at different radial depths. The oval channels $g$ are positioned within the teeth and within the pole-body of the rotor, while the channels $h$ which are positioned farther down represent an enlargement of the slot below the winding. The exterior annular radial slots $a$ are made by punching away the iron sheets according to the upper portion of cross section C—D in order to cut open the channels $g$ alone. In the two exterior annular channels $b$ $b$ however an entire punching away of the teeth and the pole-body takes place, so that also the axial channels $h$ which are positioned below the windings will be cut by the punching process. Thus while the slots $a$ are only fed from the oval axial channels $g$ the slots $b$ are also supplied from the rectangular axial channels $h$. These will therefore in spite of their greater distance from the end-surfaces of the rotor be able to convey the same or if desired also a greater quantity of cooling air than the exterior annular slot $a$, which will result in an effective cooling of the winding and other parts which are positioned farther away from the periphery of the rotor body.

In Figs. 5 and 6 we have shown a solid rotor having axial bores $g$ in the heads of the teeth and in the pole-body and axial channels $h$ below the winding. The channels $g$ are shown in cross-section Fig. 6 which is taken on the line E—F of Fig. 5, looking in the direction of the arrows. The channels $h$ which are positioned more toward the axis of the rotor will be cooled by radial bores $e$ which are arranged in four groups or sets on the middle part of the rotor.

Figs. 7 and 8 represent a solid rotor having axial bores $g$ and $h$ which are of different depth. The bores $g$ are only carried through as far as to the exterior radial slots $a$ while the bores $h$ pass through the entire rotor-body and will be cut by the radial slots $b$ which are positioned more toward the axis of the rotor.

In the foregoing figures we have shown only four examples of constructions which, however, by no means represent all possible constructions according to our invention. There are many other ways by which it may be attained that the several axial channels or groups of axial channels will exhaust at different points of the periphery of the rotor by radial discharge openings. By dimensioning the cross-sections of the axial channels as well as those of the radial channels it is possible to regulate the quantity of the discharging air and to take care that sufficient cooling air will be supplied not only at the exterior radial discharge openings but also more toward the center of the rotor-body, so that it will be possible to attain with less quantities of cooling air a greater output and efficiency of the dynamo. It is also possible, as shown in Figs. 1, 2, 5 and 6, either to arrange a plurality of groups of radial discharge openings with completely separate axial supply channels, or as shown in Figs. 3, 4, 7 and 8 to use a part of the axial supply channels for a plurality of groups or sets of radial discharge openings and to reserve the other part of said channels for only one of said groups or sets. Also a greater variety may be made in the general arrangement of the channels, for instance in Fig. 9 are shown more than two groups of axial channels at different depths of the rotor, which channels are made by a corresponding number of recesses of varying depths from the periphery of the rotor. For instance additional bores may be provided at the teeth in which case it is preferable to place the recesses $a$, which are of least depth, as near the mid-length or central transverse axis as possible, and to arrange the deeper recesses $b$ and $c$ more toward the ends of the rotor-body, as shown in Fig. 9, in order to preserve the maximum strength of the rotor body. In this case it will be necessary to provide closed walls for the axial channels at the intersecting points $x$, $y$ and $z$ so as to prevent the outermost axially arranged channels from exhausting through the radial ducts which are nearer the ends of the rotor. This can be accomplished in various manners for instance by simply inserting tubes into the axial bores 1 and 2 after having made the recesses which tubes again close the cut-open axial channel at the intersecting points $x$, $y$ and $z$ for the proper radial recesses.

Having thus described our invention we claim as new and desire to secure by Letters Patent of the United States:—

1. A rotor for dynamo electric machines provided with a plurality of series of axially extending ducts, all the ducts of one of said series being disposed farther from the rotor axis than the ducts of the other of said series, said rotor being provided with a plurality of sets of radially extending ducts of which all the ducts of one set are farther from the central transverse plane of said rotor than the remaining ducts, the ducts of each of said radial sets being in communication with the ducts of one of said axial series.

2. A rotor for dynamo electric machines having at varying distances from the rotor axis several groups of axially extending channels and radially extending air outlets communicating individually therewith, said groups of axial channels with their radial outlets being suitably distributed so that the axial channels farthest from the rotor axis will have their air outlets nearest to the central transverse plane of the rotor.

3. A rotor for dynamo electric machines having a plurality of groups of axial channels, said groups being arranged at different depths within said rotor, and a plurality of circular recesses of radial depths which increase toward the ends of the rotor body said recesses communicating each with a group of said axial channels.

4. A rotor for dynamo electric machines having a plurality of groups of axial channels, and a plurality of circular recesses of radial depths which increase toward the ends of the rotor body each of said recesses communicating with said axial channels, and tubes inserted into the axial channels of some groups for preventing communication between the axial channels in any one of those groups and the circular recesses which are connected to other groups of axial channels at greater depths.

In testimony whereof we have hereunto set our signatures in the presence of two subscribing witnesses.

ALBERT ZEHRUNG.
  REINHOLD RÜDENBERG.

Witnesses:
 WOLDEMAR HAUPT,
 HENRY HASPER.